United States Patent
Awadalla et al.

(10) Patent No.: US 11,797,755 B2
(45) Date of Patent: Oct. 24, 2023

(54) UNSUPERVISED METHOD TO GENERATE ANNOTATIONS FOR NATURAL LANGUAGE UNDERSTANDING TASKS

(71) Applicant: MICROSOFT TECHNOLOGY LICENSING, LLC, Redmond, WA (US)

(72) Inventors: Hany Mohamed Hassan Awadalla, Sammamish, WA (US); Subhabrata Mukherjee, Seattle, WA (US); Ahmed Awadallah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 431 days.

(21) Appl. No.: 16/992,571

(22) Filed: Aug. 13, 2020

(65) Prior Publication Data
US 2022/0050955 A1 Feb. 17, 2022

(51) Int. Cl.
*G06F 17/00* (2019.01)
*G06F 40/169* (2020.01)
*G06N 20/00* (2019.01)
*G06F 40/40* (2020.01)

(52) U.S. Cl.
CPC ............ *G06F 40/169* (2020.01); *G06F 40/40* (2020.01); *G06N 20/00* (2019.01)

(58) Field of Classification Search
CPC ....... G06F 40/169; G06F 40/40; G06N 20/00; G06N 3/045; G06N 3/047; G06N 3/088
USPC ........................................................... 704/9
See application file for complete search history.

(56) References Cited

U.S. PATENT DOCUMENTS

| | | | |
|---|---|---|---|
| 8,150,677 B2 | 4/2012 | Menezes et al. | |
| 9,640,173 B2* | 5/2017 | Pulz | G10L 13/047 |
| 9,747,895 B1* | 8/2017 | Jansche | G10L 15/183 |
| 10,229,674 B2* | 3/2019 | Menezes | G10L 15/187 |
| 10,380,236 B1 | 8/2019 | Ganu et al. | |
| 10,762,422 B2* | 9/2020 | Shaked | G06N 3/084 |
| 11,551,013 B1* | 1/2023 | Gupta | G06F 40/40 |
| 11,625,534 B1* | 4/2023 | Agarwal | G06N 20/00 |
| | | | 704/9 |
| 2010/0169311 A1 | 7/2010 | Tengli et al. | |

(Continued)

OTHER PUBLICATIONS

Zettlemoyer, Online Learning of Relaxed CCG Grammars for Parsing to Logical Form, Association for Computational Linguistics, 2007 (Year: 2007).*

(Continued)

*Primary Examiner* — Stephen S Hong
*Assistant Examiner* — Matthew J Ludwig
(74) *Attorney, Agent, or Firm* — WORKMAN NYDEGGER

(57) ABSTRACT

A method for training a machine learning model with parallel annotations of source instances and while facilitating security of the source instances can be performed by a system that generates a coupled machine learning model from (1) a first machine learning model trained on a first set of training data comprising unannotated natural language and (2) a second machine learning model trained on populated target templates which are populated with a plurality of vocabulary words. Once formed, the coupled machine learning model is configured to transform unannotated natural language into annotated machine-readable text.

20 Claims, 11 Drawing Sheets

(56) References Cited

U.S. PATENT DOCUMENTS

| | | | |
|---|---|---|---|
| 2010/0241698 A1* | 9/2010 | Hillerbrand | G06F 16/13 |
| | | | 707/813 |
| 2015/0324434 A1* | 11/2015 | Greenwood | G06F 16/00 |
| | | | 707/722 |
| 2015/0340024 A1* | 11/2015 | Schogol | G10L 15/26 |
| | | | 704/235 |
| 2016/0313463 A1* | 10/2016 | Wahrmund | G01V 1/30 |
| 2017/0047060 A1* | 2/2017 | Liu | G10L 13/10 |
| 2019/0303442 A1 | 10/2019 | Peitz et al. | |
| 2020/0125595 A1 | 4/2020 | Truong et al. | |
| 2020/0184278 A1* | 6/2020 | Zadeh | G06K 9/6264 |
| 2021/0209139 A1* | 7/2021 | Wu | G06F 16/9024 |
| 2021/0216577 A1* | 7/2021 | Xiao | G06F 16/3347 |
| 2022/0121884 A1* | 4/2022 | Zadeh | G06N 3/084 |

OTHER PUBLICATIONS

Artetxe, Learning bilingual word embeddings with (almost) no bilingual data, Association for Computational Linguistics, 2017 (Year: 2017).*

Young, Recent Trends in Deep Learning Based Natural Language Processing, IEEE, published 2018 (Year: 2018).*

Takahashi, Partially-Shared Variational Auto-encoders for Unsupervised Domain Adaptation with Target Shift, 2020 (Year: 2020).*

Shao, Adversarial auto-encoder for unsupervised deep domain adaptation, IET Image Processing, published 2018 (Year: 2018).*

Chambers, et al., "Template-Based Information Extraction without the Templates", In Proceedings of the 49th Annual Meeting of the Association for Computational Linguistics: Human Language Technologies—vol. 1, Jun. 19, 2011, 11 Pages.

Deshmukh, et al., "A Sequence Modeling Approach for Structured Data Extraction from Unstructured Text", In Proceedings of the 5th Workshop on Semantic Deep Learning, Aug. 2019, 10 Pages.

Ong, et al., "Automatically Extracting Templates from Examples for NLP Tasks", In Proceedings of 22nd Pacific Asia Conference on Language, Information and Computation, Nov. 2008, pp. 452-459.

Cai, et al., "An Encoder-Decoder Framework Translating Natural Language to Database Queries", In Repository of arXiv:1711.06061v1, Nov. 16, 2017, 8 Pages.

Guo, et al., "Towards Complex Text-to-SQL in Cross-Domain Database with Intermediate Representation", In Proceedings of the 57th Annual Meeting of the Association for Computational Linguistics, Jul. 28, 2019, pp. 4524-4535.

"International Search Report and Written Opinion Issued in PCT Application No. PCT/US21/030986", dated Oct. 4, 2021, 11 Pages.

* cited by examiner

UNSUPERVISED METHOD TO GENERATE ANNOTATIONS FOR NATURAL LANGUAGE UNDERSTANDING TASKS

BACKGROUND

Natural language understanding or natural language interpretation refers to a specific application of general natural language processing techniques. Tasks for natural language understanding typically are centered around machine reading comprehension or the ability for a computer system, machine, or machine learning model to comprehend, interpret, and understand natural language. Natural language can come in the form of speech such as recorded conversations, meetings, or user input commands for a digital assistant device or textual communication such as emails, texts, or news articles. Principles and techniques associated with natural language processing can be applied to tasks involving automated reasoning, machine translation, question answering, news-gathering, text categorization, voice activation, archiving, and large-scale content analysis.

Current techniques have been deployed with relative success for capturing a semantic meaning of specific pre-programmed commands in a simplified language syntax on which the machine learning model is trained. Examples of this can be seen in what has become everyday use of digital assistants like Cortana. A simple voice command such as "Cortana, find restaurants near me" would be easily understood and processed by a machine learning model, such that the processed data can be used to generate a list of restaurants in a local geographic area for the user. However, some commands are more difficult for the machine learning models to process and understand. This is illustrated, for instance, by the more complex example of: "Cortana, I'm looking to take my sister to a great restaurant tonight. Do you have any recommendations?"

In some circumstances, the "breadth" of a natural language understanding system is determined by the extent of its understanding of vocabulary and grammar. The "depth" of a system refers to how closely the system's understanding matches the understanding associated with a fluent native speaker. In particular, a system configured for natural language understanding tasks should have access to and be trained on a robust lexicon as well as large datasets of natural language examples.

Although natural language understanding technology has advanced over the years, there are still many challenges to training a machine or machine learning model for analysis of complex natural language. For example, modern natural language understanding applications have enjoyed a great boost in functionality by utilizing neural network models. However, deep neural models require a large amount of annotated data to be trained and become viable, effective models. The annotated data includes natural language text or speech that has been tagged with the correct sentence parsing, vocabulary definitions, and general semantic meaning of the text.

Conventional methods to generate the annotated data include utilizing a human reader who receives a dataset of text or speech including natural language and manually annotates the text. In some instances, the human annotator manually converts the natural language into a format that is more easily analyzed by a machine learning model. Natural language understanding for complex tasks like query understanding and sequence tagging require multiple manual annotations for each query. In the example for the use of intelligent assistants like Cortana (e.g., "Hey Cortana, text Jason that I will be 10 minutes late for the meeting" and natural language search in Outlook and Calendar (e.g., "find emails from Jason on AI and Productivity") utilize systems that are trained on thousands of annotations for each type of specific query. Even system configured to understand voice commands as simple as "call mom" still use copious amounts of manual annotations included in the training data.

This process of human annotation is both costly and time-consuming. Thus, it is not an effective or efficient process for generating the large amount of data sufficient to train the models for natural language understanding tasks.

Furthermore, the source text including the examples of natural language to be annotated often come from data generated by human users and may, in some cases, include personal or other confidential data that the users may wish to keep private or secured from being accessed by another human, even though that other human may only access the data to perform data annotation for machine learning. Thus, in some instances, entire datasets are rendered unavailable for use as training data due to privacy concerns, which can significantly hamper the ability to gather enough training data to effectively train a model for natural language processing.

In view of the foregoing, there is an ongoing need for improved systems and methods for generating training data and training models for natural language understanding while maintaining a preferred level of data security associated with the training data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for training a machine learning model with parallel annotations of source instances while facilitating security of the source instances.

Some embodiments include methods and systems for receiving a first set of training data including a plurality of source instances compiled from unannotated natural language. In these embodiments, a computing system trains a first machine learning model with the first set of training data. The first machine learning model is configured to understand a semantic structure of the first set of training data. The computing system also receives electronic content including a set of target templates and a set of vocabulary words. The set of target templates further includes a plurality of keys, and the set of vocabulary words includes a plurality of values. The plurality of values corresponds to the plurality of keys.

After receiving the electronic content, the computing system automatically populates the set of target templates with the set of vocabulary words to generate a second set of training data. This second set of training data includes the populated target templates and key-value pairings included in the target templates. In such embodiments, the second set of training data is formatted as annotated machine-readable text.

The computing system then trains a second machine learning model with the second set of training data. The second machine learning model is configured to understand an association between the plurality of keys and the plurality of values of the key-value pairings includes in the populated target templates. Subsequently, the computing system combines the first machine learning model and the second machine learning model into a coupled machine learning model. In some instances, the coupled machine learning model is configured to transform unannotated natural language into annotated machine-readable text. In some embodiments, the first set of training data is used to train the first machine learning model with unsupervised training and without rendering the plurality of source instances to any human user for annotating the first set of training data.

Some disclosed embodiments are directed towards embodiments for using and/or operating the coupled machine learning model to transform unannotated natural language into annotated machine-readable text. Additionally, in some embodiments, the computing system performs a natural language understanding task by executing the annotated machine-readable text.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
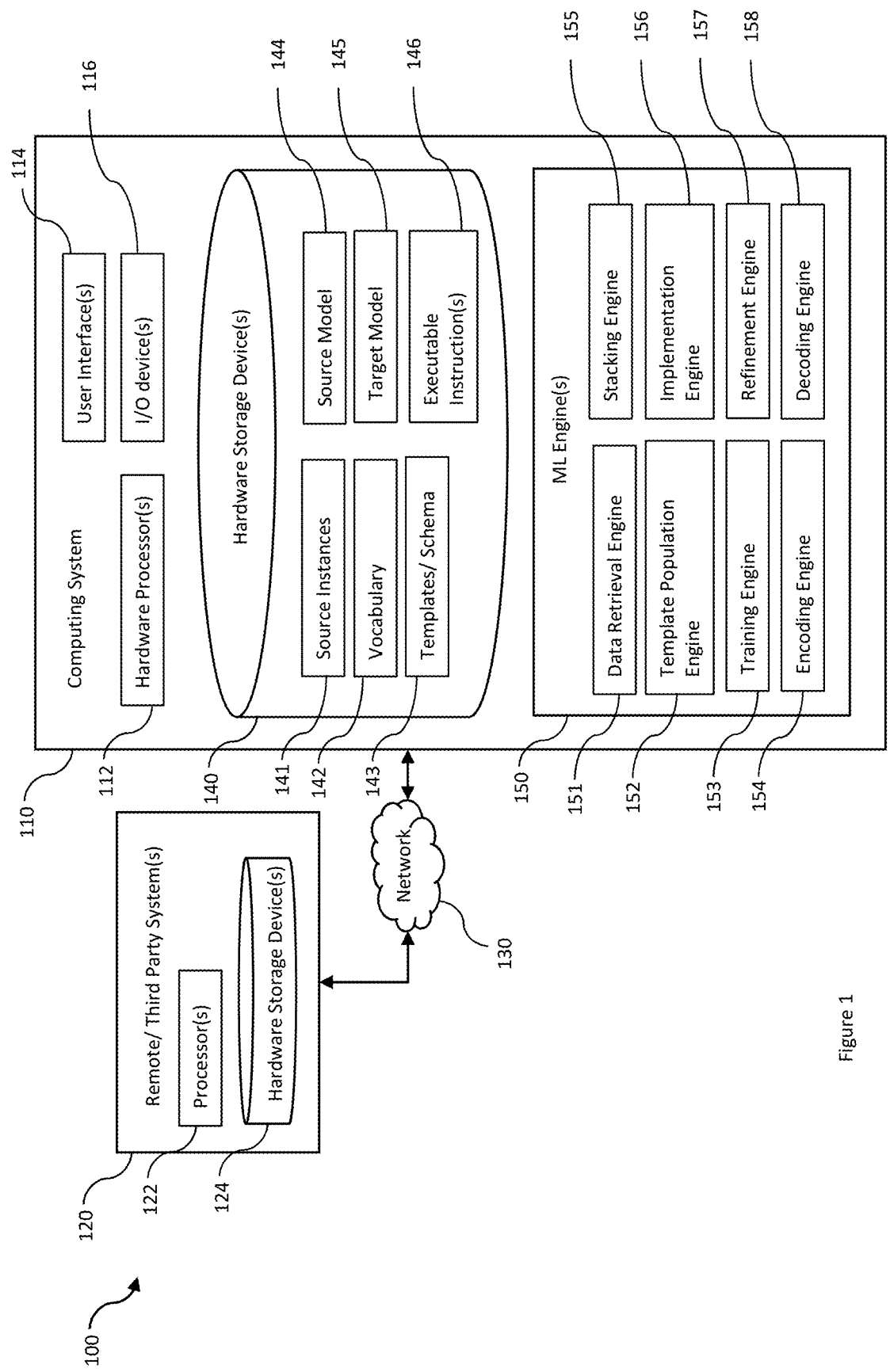
FIG. 1 illustrates a computing environment in which a computing system is configured for natural language understanding and includes hardware storage device(s) and a plurality of machine learning engines. The computing system is in communication with remote/third party system(s).

Disclosed embodiments are directed towards embodiments for training a machine learning model with parallel annotations of source instances while facilitating security of the source instances.

In some instances, the disclosed embodiments provide technical benefits over conventional systems and methods for training machine learning models configured to transform unannotated natural language into annotated machine-readable text. By way of example, a first machine learning model is trained with a first set of training data compiled from a plurality of source instances formatted as unannotated natural language. The first machine learning model is beneficially trained using unsupervised training techniques such that the source instances included in the first set of training data are not exposed to a human annotator. A second set of training data is also generated by automatically populating a set of target templates with a set of vocabulary words, wherein the set of vocabulary words correspond to a plurality of keys found in the set of target templates. The population of the set of target templates is then used to produce a plurality of key-value pairings included in the target templates.

Because of the automatic nature of the template population, vocabulary word data is not required to be rendered to a human annotator, and may be preferably kept private, without being exposed to human eyes during processing of the second set of training data, thus facilitating an increase of data security during the generation of that training data. Furthermore, the computing system can automatically populate a large number of templates to quickly and inexpensively generate an amount of training data sufficient to train a machine learning model for natural language understanding.

Subsequent to generating the second set of training data, a second machine learning model is trained using the second set of training data. The second machine learning model is configured to understand an association between the plurality of keys and the plurality of values of the key-value pairings included in the populated target templates. Once the first and second machine learning models are trained, they are combined to form a coupled machine learning model configured to transform natural language into machine-readable text.

Technical benefits of the disclosed embodiments also include the transformation of unannotated natural language into annotated machine-readable text by operating the coupled machine learning model trained and/or refined using methods and systems disclosed herein. Because the coupled model is formed from machine learning model trained on natural language and a machine learning model trained on populated target templates, the coupled model is able to efficiently and accurately transform or translate natural language into machine-readable text. Additionally, the coupled model is able to transform machine-readable text into natural language.

Additional benefits and functionality of the disclosed embodiments will be described below, including the formulation of a shared encoder, the learning and refinement of a target decoder and source decoder, and methods for aligning word embeddings to facilitate the coupling of the machine learning models.

Figure 2:
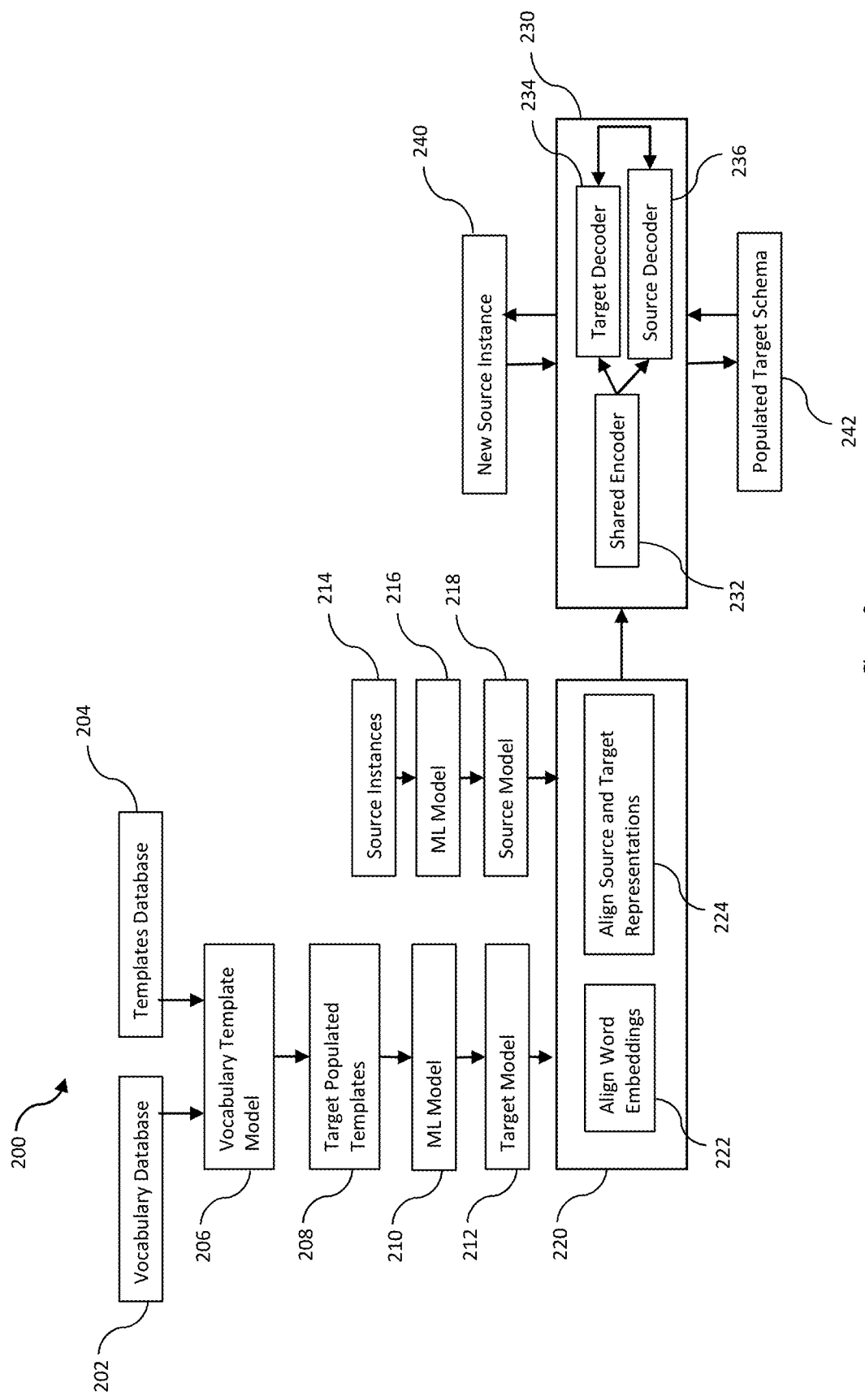
FIG. 2 illustrates one embodiment of a process flow diagram of a computing system configured to include and/or implement aspects of the disclosed embodiments.

Attention will now be directed to FIGS. 1 and 2, which illustrate corresponding components of a computing system 110 which may include and/or be used to implement aspects of the disclosed invention. As shown, the computing system includes a plurality of machine learning (ML) engines, models, and data types associated with inputs and outputs of the machine learning engines and models.

Attention will be first directed to FIG. 1, which illustrates the computing system 110 as part of a computing environment 100 that also includes remote/third party system(s) 120 in communication (via a network 130) with the computing system 110. The computing system 110 is configured to train a plurality of machine learning models for natural language understanding applications. The computing system 110 is also configured to generate training data configured for training machine learning models while facilitating data security of data extracted from sources associated with a preferred level of data security. Additionally, or alternatively, the computing system is configured to operate a trained machine learning model for natural language understanding speech and text transformations. In some instances, the computing system is configured to perform a natural language understanding task based on the natural language transformation.

The computing system 110, for example, includes one or more processor(s) 112 and a storage 140 (i.e., hardware storage device(s)) storing computer-executable instructions 146 wherein the storage 140 is able to house any number of data types and any number of computer-executable instructions 146 by which the computing system 110 is configured to implement one or more aspects of the disclosed embodiments when the computer-executable instructions 146 are executed by the one or more processor(s) 112. The computing system 110 is also shown including user interface(s) and input/output (I/O) device(s).

The storage 140 is shown as a single storage unit. However, it will be appreciated that the storage 140 is, in some embodiments, a distributed storage that is distributed to several separate and sometimes remote/third party systems 120. The system 110 can also comprise a distributed system, in some embodiments, with one or more of the system 110 components being maintained/run by different discrete systems that are remote from each other and that each perform different tasks. In some instances, a plurality of distributed systems performs similar and/or shared tasks for implementing the disclosed functionality, such as in a distributed cloud environment.

The storage 140 is presently shown as storing a plurality of machine learning models and/or engines. For example, computing system 110 comprises one or more of the following: a source model 144, a target model 145, a coupled model (see FIG. 2), a data retrieval engine 151, a template population engine 152, a training engine 153, an encoding engine 154, a stacking engine 155, an implementation engine 156, a refinement engine 157 and/or a decoding engine 158 which are individually and/or collectively configured to implement the different functionality described herein.

In some instances, the storage 140 includes computer-executable instructions 146 for instantiating or executing one or more of the models and/or engines shown in computing system 110. In some instances, the one or more models are configured as machine learning models or machine learned models. In some instances, the one or more models are configured as deep learning models and/or algorithms. In some instances, the one or more models are configured as engines or processing systems (e.g., computing systems integrated within computing system 110), wherein each engine (i.e., model) comprises one or more processors and corresponding computer-executable instructions 146.

For example, in some instances, the data retrieval engine 151 is configured to locate and access data sources, databases, and/or storage devices comprising one or more data types from which the data retrieval engine 151 can extract sets or subsets of data to be used as training data. In some instances, the data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with remote/third party systems (e.g., remote/third party systems 120) comprising remote/third party datasets and/or data sources. In some instances, these data sources comprise audiovisual services that record speech, text, images, and/or video to be used in natural language understanding applications.

In some embodiments, the data retrieval engine 151 accesses electronic content comprising a plurality of source instances 141 comprising unannotated natural language to be used in a first set of training data configured to be used to train a model (e.g., source model 144). In such embodiments, the data retrieval engine 151 is also configured to receive a plurality of vocabulary words 142 (e.g., values) and a plurality of templates and/or schema 143 to be used in a second set of training data. In some embodiments, the data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired natural language understanding application.

In some instances, the data retrieval engine 151 locates, selects, and/or stores raw unstructured source data (e.g., unannotated source instances), wherein the data retrieval engine 151 is in communication with one or more other ML engines and/or models included in computing system 110 (e.g., template population engine 152, training engine 153, etc.). In such instances, the other engines in communication with the data retrieval engine 151 are able to receive data that has been retrieved (i.e., extracted, pulled, etc.) from one or more data sources such that the received data is further augmented and/or applied to downstream processes.

For example, in some embodiments, the data retrieval engine 151 is in communication with the template population engine 152. The template population engine 152 is configured to receive a plurality of vocabulary 142 (e.g., data extracted from source instances, data received from internal and/or external databases, annotated keywords, etc.) and a plurality of target templates and/or target schema 143. The template population engine 152 is then able to automatically populate the templates with the vocabulary keywords 142 (e.g., vocabulary values). In some instances, the input fields of the target templates/schema are annotated with one or more keys, wherein a vocabulary value 142 corresponds to one or more keys to form key-value pairings. In such instances, the populated templates including the key-value pairings are used as the second set of training data to train a model (e.g., target model 145).

In some embodiments, the vocabulary 142 is also annotated such that the annotations are matched between the keys and the values to form the key-value pairings. For example, one or more templates including an input field for a username is able to be populated with one or more vocabulary words known to be usernames. In some embodiments, where the vocabulary words are not previously annotated, the data retrieval engine 151 is configured to annotate the vocabulary words such that the vocabulary words are vocabulary values that correspond to one or more target template keys.

In some embodiments, the data retrieval engine 151 and/or the template population engine 152 is/are in communication with the training engine 153. The training engine 153 is configured to receive one or more sets of training data from the data retrieval engine 151 and/or template population engine 152. After receiving training data relevant to a particular natural language understanding applications or task, the training engine 153 trains one or more models on the training data for the particular natural language understanding applications. In some embodiments, the training engine 153 is configured to train a model via unsupervised training (e.g., without annotated data).

Additionally, or alternatively the training engine 153 is configured to train a model via supervised training (e.g., using annotated data as ground truth). The training engine 153 is beneficially configured to be able to use training data that has not been annotated by a human reader/annotator such that the data security (i.e., privacy) of the training data used is maintained.

For example, in some embodiments, the training engine 153 is configured to train a model (e.g., source model 144) on an unannotated set of training data comprising unstructured (i.e., unannotated) natural language such that the machine learning model is configured to understand a semantic structure of the unannotated set of training data. In such embodiments, the training engine is able to train the model via unsupervised training.

In some embodiments, the model is trained to understand the semantic structure and/or semantic meaning of the training data using masking techniques. Masking refers to the process of removing certain words or tokens from the natural language sentences and train the model to predict the words which the empty token slots should be filled with. As the predictions are compared with the original sentence, the model is able to increase the accuracy of making those predictions. The model (e.g., the source model 144) learns how different words come together to form coherent context or discourse.

In some embodiments, the training engine 153 is configured to train a model (e.g., target model 145) on an annotated set of training data comprising automatically populated target templates (as described above). In such embodiments, the target model 145 is configured to understand an association between the plurality of keys and the plurality of values of the key-value pairings included in the populated target templates.

In some embodiments, the target model 145 is trained to understand the key-value pairings as structured in a specific programming language (e.g., Json, custom XML, SQL, Python, C, etc.). In such instances, the target model 145 is trained on a set of training data comprising target templates written in the corresponding programming language. In some embodiments, the training engine 153 is also configured to train the source model 144 and the target model 145 as a joint (i.e., coupled) model.

In some embodiments, the training engine 153 is in communication with a stacking engine 155. In such embodiments, the stacking engine 155 is configured to combine one or more models into a joint and/or coupled machine learning model. For example, the stacking engine 155 is configured to combine the target model 145 and the source model 144 into a coupled machine learning model configured for simple and/or complex natural language understanding applications. Specifically, in some embodiments, the coupled machine learning model is configured to transform natural language into machine-readable text (e.g., unannotated source instances into populated target templates).

In some embodiments, the stacking engine 153 is an alignment engine configured to align a plurality of word embeddings representing associated words included in the unannotated natural language and the machine-readable text. Additionally, or alternatively, the alignment engine (e.g., stacking engine 153) is configured to align the word embeddings by (1) mapping tokens included in the unannotated natural language and the machine-readable text and then (2) aligning the entire context of a sequence of tokens included in the unannotated natural language (e.g., source instances 141) and the annotated machine-readable text (e.g., populated target templates, see FIG. 2), wherein the token mapping is configured to align the entire context of the sequence of tokens. In some embodiments, the token mapping at the individual token level initiates the alignment of entire context of the sequence of tokens. Because of this alignment process (see FIG. 5), the source model and target models are able to be trained separately and trained using different sets of data before being aligned/combined.

In some embodiments, the computing system 110 includes an encoding engine 154 configured to learn and/or operate a shared encoder between one or more models (e.g., the source model 144 coupled with the target model 145). In some embodiments, the encoder is neural network that takes the input and outputs a feature map, a vector and/or a tensor. In some embodiments, the shared encoder is part of an encoder-decoder network (see FIG. 7).

In some embodiments, the computing system 110 includes a decoding engine 158 configured to learn one or more decoders. Generally, a decoder is neural network that takes the feature map, vector and/or tensor from an encoder and generates a best match to the intended input. In some embodiments, the decoding engine 158 is configured to learn and/or implement a target decoder trained for decoding and/or generating populated and/or unpopulated target templates. Additionally, the decoding engine 158 is configured learn and/implement a source decoder trained for decoding and/or generating unannotated natural language. In such embodiments, the target decoder and the source decoder are learned separately.

In some embodiments, the decoding engine 158 is in communication with a refinement engine 157 that is configured to refine the target decoder and source decoder by employing a feedback loop between the source decoder and the target decoder. (See FIG. 6). The decoders are learned and/or refined by iteratively minimizing the reconstruction loss from transforming the source into the target and the target into the source. In some embodiments, the decoding engine 158 are configured to use the shared encoder and implement denoising and variational auto encoding techniques to learn the decoders for the source instances and the target schemas separately. In some embodiments, the refinement engine 157 is also configured to refine and/or optimize any one or a combination of machine learning engines/models included in the computing system 110 to facilitate an increase in efficiency, efficacy, and accuracy of the engines/models.

In some embodiments, the computing system 110 includes an implementation engine 156 in communication with any one of the models and/or ML engines 150 (or all of the models/engines) included in the computing system 110 such that the implementation engine 156 is configured to implement, initiate or run one or more functions of the plurality of ML engines 150. In one example, the implementation engine 156 is configured to operate the data retrieval engines 151 so that the data retrieval engine 151 retrieves data at the appropriate time to be able to generate training data for the training engine 153.

In some embodiments, the implementation engine 156 facilitates the process communication and timing of communication between one or more of the ML engines 150. In some embodiments, the implementation engine 156 is configured to implement a joint model (e.g., the coupled source-target model) to transform unannotated natural language into machine-readable text. Additionally, or alternatively, the implementation engine 156 is configured to perform a natural language understanding task by executing the machine-readable text (e.g., populated target schema).

In some embodiments, the computing system 110 accesses and/or stores one or more data types, for example, source instances 141, vocabulary 142, unpopulated templates/schema 143 and/or machine learning models (e.g., source model 144, target model 145). In some embodiments, the source instances 141 comprise unannotated (unstructured) natural language. For example, in some implementations, the source instances 141 comprise one or more of the following: excerpts from user emails, conversational text or audio, user voice commands/questions, search engine queries, digital assistant user input, etc.). In some embodiments, the vocabulary 142 comprise keywords or values, for example, usernames, emails, locations, times, specific task names, website URLs, etc. In some embodiments, the computing system 110 accesses and/or stores target templates/target schema 143.

It should be appreciated that the target templates correspond to a variety of types of machine-readable text. In some embodiments, the target templates are written in a specific programming language including one or more of the following: SQL, Json, python, rest API, or other query language. In such embodiments, the keys of the input fields of the templates are written according to the syntax of the desired programming language. In some embodiments, the templates are formatted as displayed interface content and/or user interfaces. (See FIG. 10).

In some embodiments, the computing system is in communication with remote/third party systems 120 comprising one or more processor(s) 122 and one or more computer-executable instruction(s) 124. It is anticipated that, in some instances, the remote/third party systems 120 further comprise databases housing data that could be used as training data, for example, external vocabulary and/or source instance databases. Additionally, or alternatively, the remote/third party systems 120 include machine learning systems external to the computing system 110.

In some embodiments, the remote/third party systems 120 are software programs or applications (e.g., Exchange). In such embodiments, users sometimes will interact with the applications via natural language commands. Often, these applications or programs cannot "understand" natural language. However, they do understand structured commands found in programming language such as "filter", "select", or "search". Thus, by implementing the systems and methods disclosed herein, a user may conversationally interact with programs configured for natural language input, wherein the coupled machine learning model is able to transform the natural language into machine-understandable code that can be executed by the application.

Attention will now be directed to FIG. 2. FIG. 2 illustrates one embodiment of a process flow diagram of a computing system configured to include and/or implement aspects of the disclosed embodiments. FIG. 2 is shown including a plurality of data types including a vocabulary database 202, a templates database 204, and source database comprises source instances 214. FIG. 2 is also shown including a plurality of machine learning models, for example, ML model 210A, ML model 210B, target model 212, source model 216, coupled model 220, and an encoder-decoder network 230.

In some embodiments, the computing system 110 is configured to access the plurality of source instances 214 comprising unannotated natural language. The computing system 110 generates a first set of training data comprising the plurality of source instances, wherein an ML model (e.g., ML model 210B) is trained on the natural language included in the first set of training data so that the ML model is configured to understand a semantic structure and/or semantic meaning of the plurality of source instances 214. After training, the ML model 210B is then configured as the trained source model 216. It should be appreciated that the ML model 210B is able to be trained as source model 216 via unsupervised training so that the content of the source instances comprising personal and/or private data is not rendered to a human observer during the generation of the training data or during the training of the model.

In some embodiments, the computing system 110 is configured to access a vocabulary database 202 comprising vocabulary words (i.e., vocabulary 142 stored in storage 140) and a templates database 204 comprising target templates/schema (e.g., 143 stored in storage 140). It is anticipated that the target templates/schema are unpopulated or semi-unpopulated, wherein one or more input fields are unpopulated. It should be appreciated that there is a plurality of different types of vocabulary and/or vocabulary databases that are accessed by and/or stored in the computing system 110.

For example, in some embodiments, the vocabulary database 204 comprises a plurality of columns and rows, wherein each column has a pre-determined label (e.g., name, location, email address, identification number, object). Thus, by matching the column label and the key included in the target template, the template can be populated with a value included in the corresponding column. Additionally, or alternatively, the keys included in the templates are derived from the column and/or row labels. In some embodiments, the vocabulary database 204 is configured as a directory, a dictionary, or other organized collection of data.

In some embodiments, the unpopulated or semi-populated target templates included in the templates database 204 include pre-determined definitions or mapping information to specify which sources of vocabulary words should be used to populate the particular template or type of template. Thus, in some embodiments, the target templates included in the templates database 204 comprise pre-defined attributes that facilitate the mapping to one or more vocabulary sources (i.e., vocabulary databases).

In some embodiments, one or more particular keys included in the target templates comprise user-defined attributes that determine what values or types of values correspond to the one or more particular keys. In some embodiments, these attributes of the template, and/or more specifically of the keys included in the template, are stored in the definition of the target schema.

In some embodiments, the vocabulary words included in the vocabulary database 202 comprise values extracted from unlabeled data (i.e., natural language source instances). In some embodiments, the extracted values comprise words or phrases comprising nouns or a sequence of nouns.

In this manner, the vocabulary template model 206 is configured to automatically populate the empty input fields identified by one or more keys with the corresponding values of vocabulary words to form key-value pairings. In some embodiments, the vocabulary template model 206 is representative of a combination of the data retrieval engine 151 and the template population engine 152, wherein the vocabulary template model is configured to receive data (e.g., from the vocabulary database 202 and the templates database 204) and automatically generate synthetically populated target templates 208. In some embodiments, the synthetically populated target templates are semi-populated and/or fully populated using values obtained from the vocabulary database 202.

The computing system 110 generates a second set of training data comprising the populated target templates, wherein the second set of training data is applied to ML model 210A. After training, the ML model 210A is configured as target model 212. Target model 212 is configured to understand an association between the keys and values of the key-value pairings included in the populated target templates. For example, the target model 212 is able to understand and identify a relationship between the key "email" and the value "alice@contoso.com" corresponding to the key "email". Thus, the target model 212 would be able to understand that values of similar structure and meaning to "alice@contoso.com" corresponds to the key identifying an email or email address. Furthermore, the target model 212 is able to recognize patterns, for example, that certain key-value pairings are more likely to occur with certain types of keys. For example, in some embodiments, the target model 212 is configured to understand that the key for recipient most likely corresponds to a value for an email. In addition, the target model 212 is configured to understand (i.e., predict) that certain key-value pairings are more likely to occur with certain recipient types. In another example, the target model 212 is able to learn that a key for file format type (e.g., PowerPoint) is likely to be associated with a key for object type of "digital document".

The target model 212 and source model 216 are beneficially pre-trained, separately (concurrently in parallel and/or at independent/different times in serial), using the first and second sets of training data to facilitate an efficient alignment or coupling of the aforementioned model to form a coupled machine learning 220 configured for natural language understanding applications and tasks.

Once the source model 216 and the target model 212 are trained, the computing system 110 combines the models to form the coupled machine learning model 220. The coupled machine learning model 220 is formed by aligning, at a token level, the word embeddings of data found in the target model 212 and the source model 216 (see align word embeddings 222) and by aligning, at a context level, the source and target representations (see item 224).

The formation and training of the coupled machine learning model 220 also facilitates the generation of an encoder-decoder network 230. Now, using the trained coupled machine learning model 220 including the encoder-decoder network 230, a user or system may input a new source instance 240, wherein the model will transform the natural language included in the new source instance into a populated target schema 242.

It should be appreciated that the new source instance, in some instances, comprises words or phrases that were not included in the training data used to train the model. Because of the dual training and subsequent coupling of the models, the coupled machine learning model 220 is able to generalize patterns that it previously learned to understand, encode and decode new source instances that it encounters. Thus, the output comprises an accurate populated target schema 242. Conversely, if the input to the model (i.e., encoder-decoder network) is a populated target schema 242, the model is able to transform the annotated machine-readable text of the populated target schema 242 into natural language (e.g., as found in a source instance 240). (See FIGS. 7 and 8).

Figure 3:
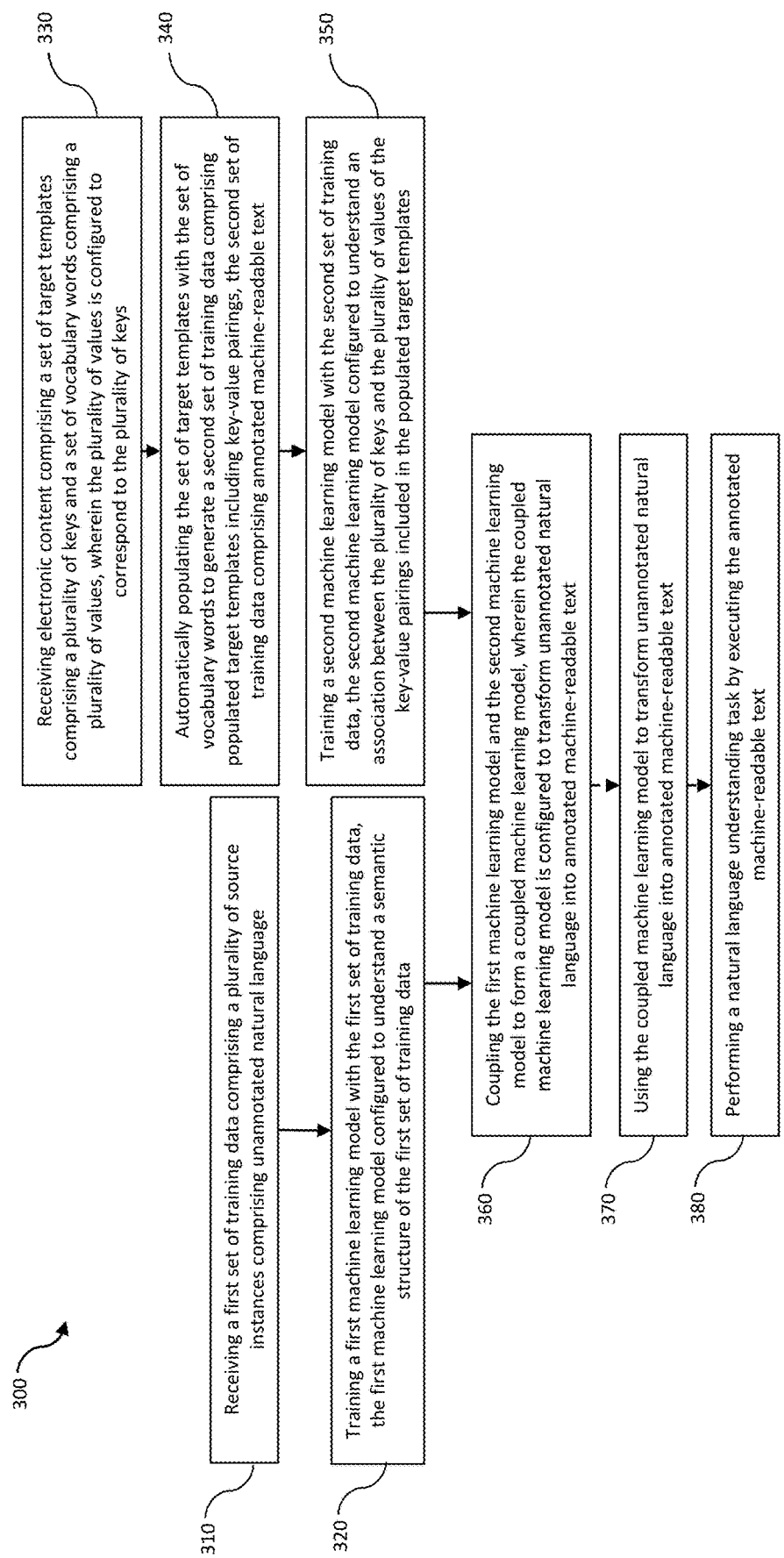
FIG. 3 illustrates one embodiment of a flow diagram having a plurality of acts associated with methods for unsupervised training of a machine learning model for natural language understanding utilizing machine-generated training data.

Attention will now be directed to FIG. 3 which illustrates a flow diagram 300 that includes various acts associated with exemplary methods that can be implemented by computing systems, such as computing system 110 described above in reference to FIG. 1. As shown in FIG. 3, the flow diagram 300 includes a plurality of acts (act 310, act 320, act 330, act 340, act 350, act 360, act 370, and act 380) which are associated with various methods for generating training data and training a machine learning model for natural language understanding tasks, for example, transforming unstructured natural language into structured machine-understandable text. Examples of claimed components claimed in the acts are described in reference to features of a computing system, for example, computing system 110 of FIG. 1 and/or associated process flow diagram paths as described in reference to FIG. 2.

As shown in FIG. 3, the flow diagram 300 and corresponding methods include an act of a computing system (e.g., computing system 110) receiving a first set of training data comprising a plurality of source instances (e.g., source instances 141). The source instances are configured to comprise unannotated natural language (act 310). After receiving the first set of training data, the computing system trains a first machine learning model with the first set of training data (act 320). The first machine learning model is configured to understand a semantic structure of the first set of training data.

The flow diagram 300 also includes an act for receiving electronic content comprising a set of target templates (e.g., templates/schema 143, from template database 202) comprising a plurality of keys and a set of vocabulary words comprising a plurality of values, wherein the plurality of values is configured to correspond to the plurality of key (act 330). Subsequently, the set of target templates is automatically populated with the set of vocabulary words to generate a second set of training data comprising populated target templates including key-value pairings (act 340). The second set of training data comprises annotated machine-readable text. Once the second set of machine learning data is generated, the computing system trains a second machine learning model with the second set of training data, wherein the second machine learning model is configured to understand an association between the plurality of keys and the plurality of values of the key-value pairings included in the populated target templates (act 350). In some embodiments, it should be appreciated that acts 310 and 320 are performed in parallel with acts 330, 340, and/or 350. In some embodiments, acts 310 and 320 are performed in series with acts 330, 340, and 350.

Thereafter, the computing system combines the first machine learning model and the second machine learning model to form a coupled machine learning model (e.g., coupled machine learning model 220), wherein the coupled machine learning model is configured to at least transform unannotated natural language into annotated machine-readable text (act 360).

In some embodiments, methods implemented by the computing system include an act for using the coupled machine learning model to transform unannotated natural language into annotated machine-readable text (act 370).

Additionally, or alternatively, the method includes an act for performing a natural language understanding task by executing the annotated machine-readable text (act 380). This task may be any task that processes natural language to form an understanding of a query associated with the natural language and/or may include processing and generating/returning a response to the query. This process may include understanding the natural language of a template that includes a query and generating a corresponding response that may be rendered in a template. It will also be appreciated that the act of performing a natural language understanding task may occur with the same computer device(s) that performed the aforementioned acts (e.g., acts 310-370), or alternatively by one or more different computer device(s) of a same distributed system.

Figure 4:
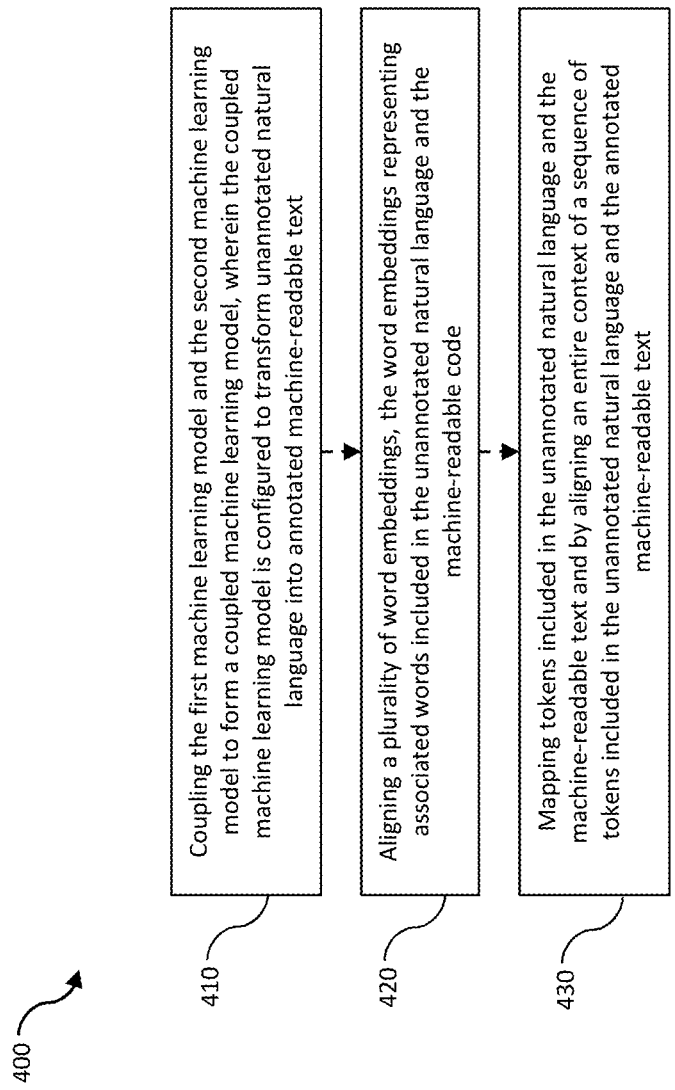
FIG. 4 illustrates one embodiment of a flow diagram having a plurality of acts associated with methods for coupling machine learnings models to form a machine learning model configured for natural language understanding.

Attention will now be directed to FIG. 4, which illustrates a flow diagram 400 that includes various acts associated with exemplary methods that can be implemented by computing systems, such as computing system 110 described above in reference to FIG. 1. As shown in FIG. 4, the flow diagram 400 includes a plurality of acts (act 410, act 420, and act 430) which are associated with various methods for generating training data and training a machine learning model for natural language understanding tasks, for example, coupling a set of machine learning models by aligning a plurality of word embeddings associated with the set of machine learning models. Examples of claimed components claimed in the acts are described in reference to features of a computing system, for example, computing system 110 of FIG. 1 and/or associated process flow diagram paths as described in reference to FIG. 2.

As shown in FIG. 4, the flow diagram 400 and corresponding methods include an act of a computing system (e.g., computing system 110) for coupling the first machine learning model (e.g., source model 144) and the second machine learning model (e.g., target model 145) to form a coupled machine learning model (e.g., coupled machine learning model 220), wherein the coupled machine learning model is configured to transform unannotated natural language into annotated machine-readable text (act 410).

It should be appreciated that, in some embodiments, act 410 is representative of act 360 of method 300. In some instances, the machine learning models are coupled by aligning a plurality of word embeddings, the word embeddings representing associated words included in the unannotated natural language and the machine-readable code (act 420). Additionally, or alternatively, the machine learning models are aligned by mapping tokens included in the unannotated natural language and the machine-readable text and by aligning an entire context of a sequence of tokens included in the unannotated natural language and the annotated machine-readable text (act 430).

Figure 5:
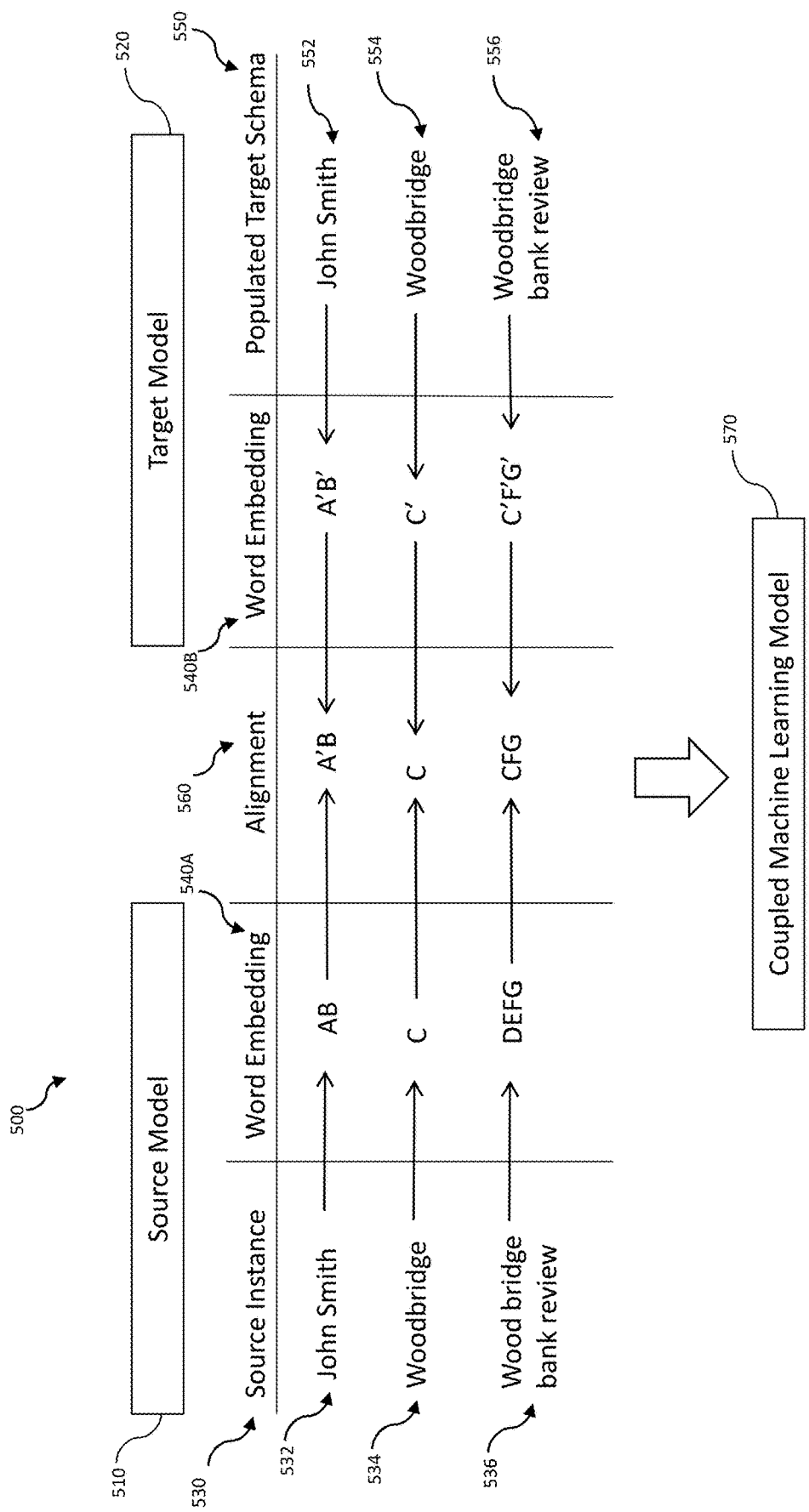
FIG. 5 illustrates one embodiment of a process flow diagram for coupling the machine learning model by aligning word embeddings.

Attention will now be directed to FIG. 5, which illustrates an example embodiment of a process to combine separately trained models into a coupled machine learning model. In some embodiments, the process is brought about by aligning associated word embeddings. In such embodiments, as shown in FIG. 5, a source model 510 is shown as being separate (i.e., independent, separately trained) from a target model 520. In some embodiments, source model 510 is representative of source model 216 and/or target model is representative of target model 212. In some instances, the source model 510 is configured to receive unannotated natural language and output a learned representation (e.g., word embedding) for the text of the natural language (e.g., source instances 530), wherein each token and/or a sequence of tokens corresponds to a word embedding 540A.

For example, the phrase or source instance "John Smith" is represented by the word embedding "AB". In another example, the word "Woodbridge" 534 is represented by the word embedding "C". The phrase "Wood bridge bank review" is also shown being represented by "DEFG". The representation for a word embedding is typically a mathematical representation such as a vector or other expression. However, letters are shown to represent the word embeddings presented in FIG. 5 for explanatory purposes.

The target model 520 is shown being configured to receive a populated target schema 530 and represent words (e.g., keys and/or values) as a word embedding 540B. For example, the name "J. Smith" 552 is represented by word embedding "A'B'", the word for "Woodbridge" 554 is represented by "C', and "Woodbridge bank review" 556 is represented by C'F'G'".

In general, a word embedding is a learned representation for text where words that have the same meaning have a similar representation. Therefore, names such as "John Smith" or the word "Woodbridge" should have similar and/or identical word embeddings no matter the model by which the word embedding was attributed to the word or phrase. As can be seen in FIG. 5, because the source model 510 and the target model 520 were trained separately, the representation for the same words are different (i.e., word embeddings 540A and word embeddings 540B should match since the source instance 530 are an exact match, or almost an exact match, to the words included in the populated target schema 550).

Thus, to align the source model 510 and the target model 520, the word embeddings are aligned into a shared representation space (e.g., alignment 560). For example, "John Smith" 532 is aligned to "J. Smith" 552, wherein the model chooses a combination of "AB" and "A'B'" (e.g., $\hat{A}B$) to exist as the word embedding for "John Smith". In an exemplary case for "Woodbridge", the alignment 560 is shown aligning the word embedding to "$\hat{C}$". In some embodiments, word embedding 540B was replaced by word embedding 540A for the aligned word embedding).

It should be noted that source instance 536 varies slightly from populated target schema 556, wherein there is a space between the words "wood" and "bridge in source instance 536 and no space (e.g., "Woodbridge") in populated target schema 556. However, "bank review" 536 is an exact match to "bank review" 556. Therefore, in some embodiments, when certain tokens are an exact match, words that are located nearby the exact match are also able to be aligned, in the case where the nearby words are similar to each other, but not an exact match. Thus, "DEFG" and "C'F'G" are aligned to "ĈF̂Ĝ". In some embodiments, a previously learned aligned word embedding (e.g., "C" for Woodbridge) is used in subsequent alignments.

In some embodiments, not all of the same tokens or concepts that appear on the source side of training will appear on the target side of training. However, some of the same tokens and concepts will appear as exact matches. By leveraging those instances that are exact matching (e.g., "John Smith" 532 and "J. Smith" 552), the system can align the two different representations into a shared representation space. In some instances, where the tokens from the source instance 530 and the tokens from the populate target schema 550 are not exact matches, the system looks for other attributes that would indicate a match (e.g., in the case for "Wood bridge bank review"). The system can also learn to map those specific values to corresponding keys included in the available target templates (e.g., the system can learn that "John Smith" maps to a key for a name, thus the aligned word embedding for "John Smith" is associated with the word embedding for "name". Therefore, in some embodiments, all "names" would include one or similar features that indicate that that particular token should be associated with the key "name".

In some embodiments, the disclosed embodiments for aligning word embeddings are also applicable to cross lingual translations. In such instances, the source and target models are trained in a particular language (e.g., source model trained in English and target model trained in Spanish). The word alignment (e.g., alignment 560) can be done cross lingual as well to align source and target models in different languages to be able to generate data in another language. For example, in some embodiments, the unannotated natural language is written in a first language and the target templates are written in a second language, wherein the coupled machine learning model is able to translate between the first and second language. In some embodiments, the source model and the target model are both trained on unannotated natural language, wherein the source model is trained in a first language and the target model is trained in the second language.

Figure 7:
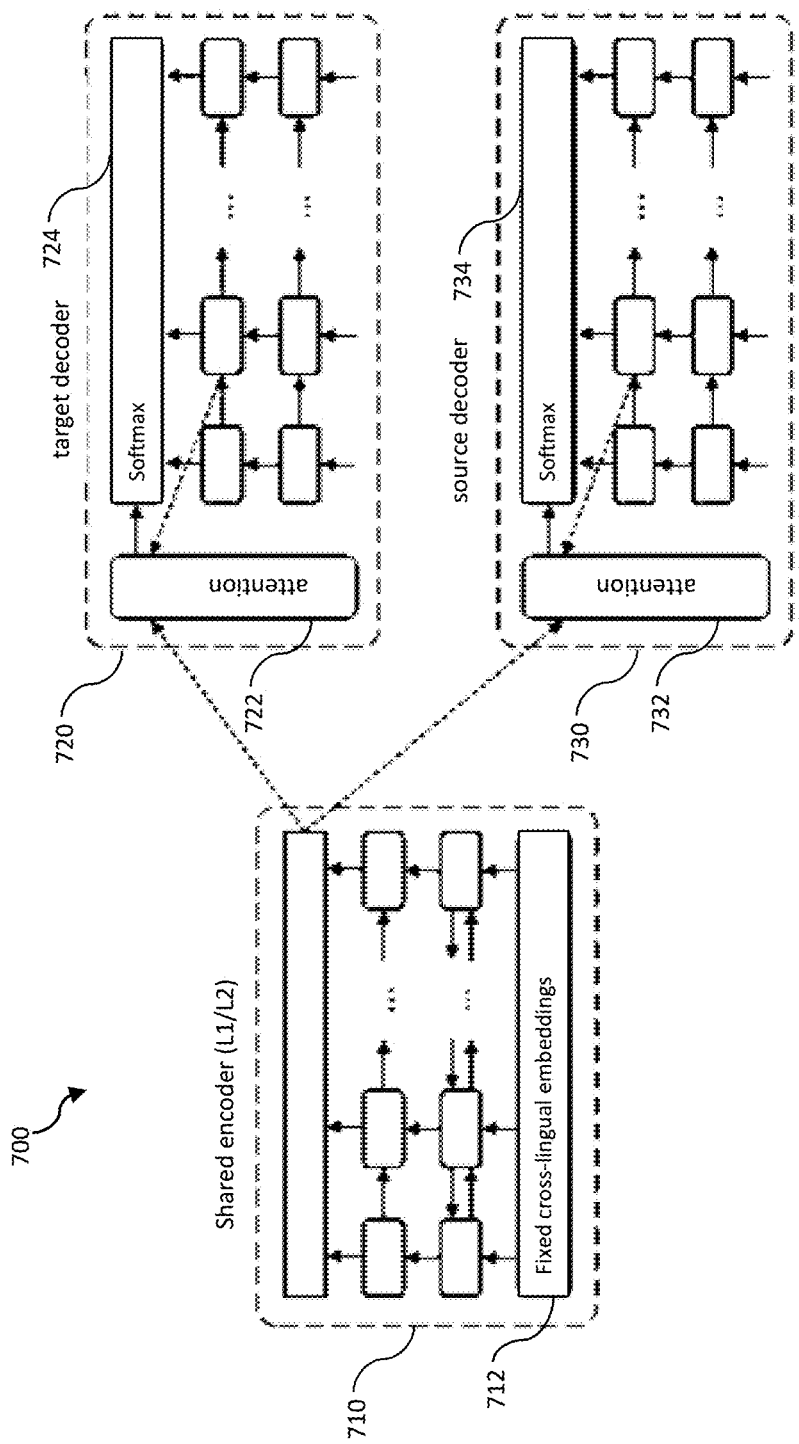
FIG. 7 illustrates one embodiment of a design overview of an example of an encoder-decoder network included in a coupled machine learning model.
Figure 8:
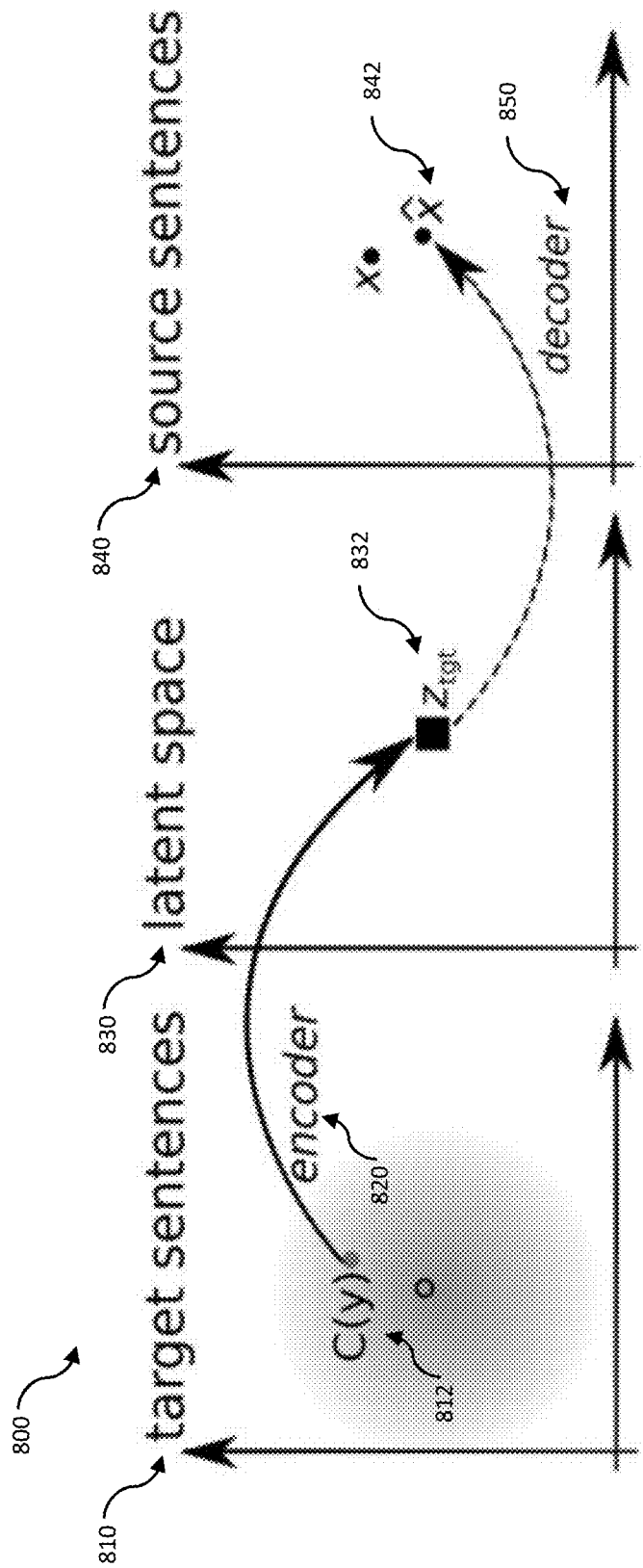
FIG. 8 illustrates one embodiment of an example of a machine learning model transforming machine-readable text into natural language.

The word embeddings are therefore aligned such that the first language text is encoded into a source space and the second language text is encoded into the target space, wherein the word embeddings (i.e., encoded text) is then aligned by a similar process as described by FIGS. 7 and 8. The coupled machine learning model is then able to translate source instances in the first language into source instances in the second language, wherein the translation process is reversible.

When the coupled machine learning model 570 views a sufficient number of examples of how to select a certain type of value and map it to a particular key, it is able to generalize what it has learned to be applicable to examples it has never seen before. For example, it learns that when a particular token (e.g., a name) appears in a particular way and space of the text, it is able to recognize it as a name even if the name was not included in the original training data.

After a plurality of word embeddings are aligned, the coupled machine learning model 570 is then configured with a shared representation space and can now learn a shared encoder (e.g., shared encoder 232 of FIG. 2). In some embodiments, the word embedding alignment is performed with acts included in method 400 and/or 600.

Figure 6:
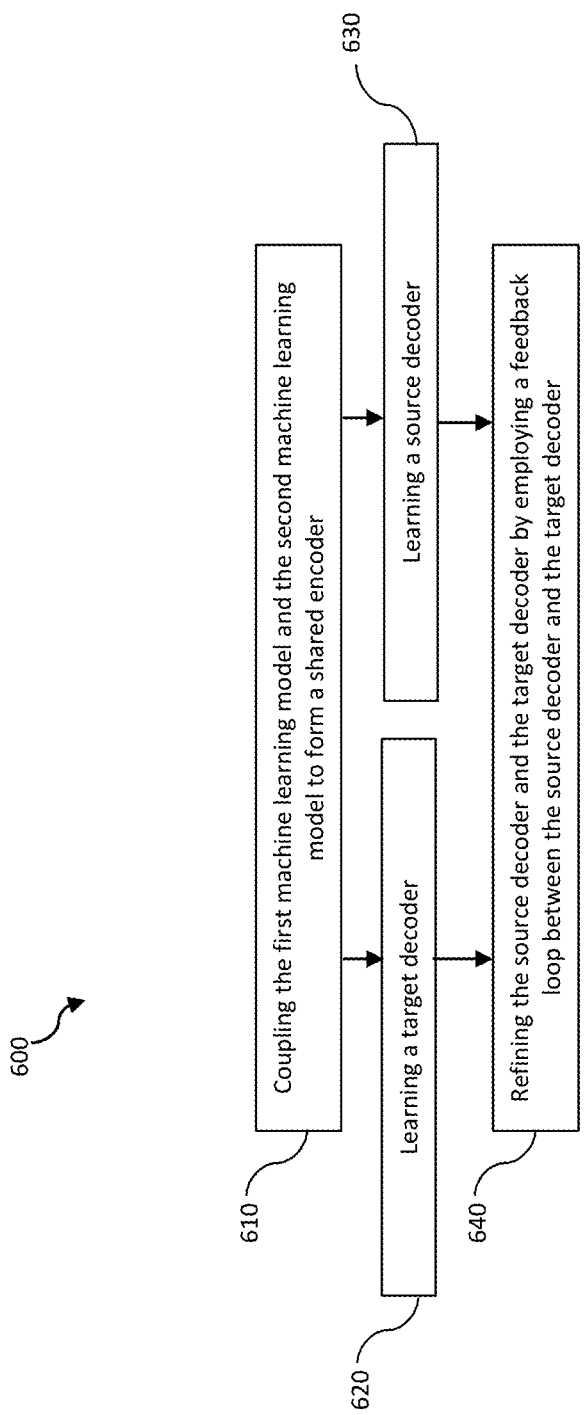
FIG. 6 illustrates one embodiment of a flow diagram having a plurality of acts associated with methods for unsupervised training of a machine learning model for natural language understanding, including forming an encoder-decoder network.

Attention will now be directed to FIG. 6 which illustrates a flow diagram 600 that includes various acts associated with exemplary methods that can be implemented by computing systems, such as computing system 110 described above in reference to FIG. 1. As shown in FIG. 6, the flow diagram 600 includes a plurality of acts (act 610, act 620, act 630, and act 640) which are associated with various methods for training a machine learning model for natural language understanding tasks, for example, coupling a set of machine learning models to form a shared encoder and learning a target decoder and a source decoder separately. Examples of claimed components claimed in the acts are described in reference to features of a computing system, for example, computing system 110 of FIG. 1 and/or associated process flow diagram paths as described in reference to FIG. 2.

As shown in FIG. 6, the flow diagram 600 and corresponding methods include an act of a computing system (e.g., computing system 110) for coupling a first machine learning model (e.g., source model 144) and a second machine learning model (e.g., target model 145) to form a shared encoder (e.g., shared encoder 232) (act 610). After forming the shared encoder, the computing system learns a target decoder (act 620) and a source decoder (act 630) separately.

Once the decoders are learned, the computing system refines the source decoder and the target decoder by employing a feedback loop between the source decoder and the target decoder to improve an accuracy and/or confidence of the source decoder and the target decoder (act 640). It should be appreciated that, in some instances, act 620 and act 630 are performed in parallel. In some embodiments, act 620 and act 630 are performed in series. In some embodiments, act 620 and act 630 are performed simultaneously while maintaining separate training processes.

Attention will now be directed to FIG. 7. FIG. 7 illustrates one embodiment of an example process 700 of a machine learning model and/or an encoder-decoder network transforming machine-readable text into natural language. For example, an initial target sentence 712 is identified from a plurality of target sentences 710. In some embodiments, the target sentences 710 refer to populated target templates and/or any annotated machine-readable text.

As shown, an encoder 720 (e.g., shared encoder 810 of FIG. 8) is shown encoding the target sentence C(y) 712 into a latent space 730 as representation 732, which represents the initial target sentence 712. In some embodiments, the latent space 730 is a shared representation space between target-oriented components and source-oriented components. In some instances, the latent space 730 is created by the alignment of word embeddings (see alignment 560 of FIG. 5) to combine the source model and target model.

After being embedded into the shared latent space 730, a decoder 750 (e.g., source decoder 830) is able to decode the target sentence representation 732 and transform the initial target sentence 712 into a corresponding source sentence 742. In some examples, a populated target template is transformed into the corresponding natural language representing the populated target template.

It should also be appreciated, that the process 700 is reversible. For example, an initial source sentence can be encoded into the latent space 730 and transformed into the corresponding annotated machine-readable text (e.g., populated target template). In some embodiments, process 700 is implemented by an implementation engine (e.g., implementation engine 156).

In some embodiments, process 700 is also the process by which the target decoder and the source decoder are refined, wherein the feedback loop is facilitated by transforming a source sentence into a target sentence and back into the source sentence. The encoder-decoder network (e.g., network 800) is able to facilitate an increase in accuracy and/or confidence associated with the transformation. For example, as the process 700 is looped, the initial source sentence is compared to the source sentence that is generated based on the target sentence. The machine learning model can then change one or more parameters in the refinement training so that the initial source sentence increasingly matches the generated source sentence. In some embodiments, process 700 is implemented by a refinement engine (e.g., refinement engine 157).

Attention will now be directed to FIG. 8, which illustrates one embodiment of a design overview of an example of an encoder-decoder network 800 included in a coupled machine learning model (e.g., coupled machine learning model 570). In some embodiments, this illustrated network is representative of the encoder-decoder network referenced in FIG. 6, wherein act 640 is able to be performed to refine the decoders according to the disclosed embodiments. In some embodiments, the encoder-decoder network 800 comprises a shared encoder 810, a target decoder 820 and a source decoder 830. For example, in some instances, the shared encoder 810 is shared between a source model and a target model. Additionally, or alternatively, the shared encoder 810 is shared between the target decoder 820 and the source decoder 830.

In other words, an input from either source-oriented component (e.g., source model, source decoder, source instances) or target-oriented components (e.g., target model, target decoder, populated target templates) will be processed by the shared encoder 810. In some embodiments, the shared encoder 810 comprises a neural network, wherein word embeddings 812 are used as input to a series of network components. In some embodiments, the target decoder 820 comprises an attention module 822 which sends output to a SoftMax layer 824. Additionally, the source decoder 830 comprises an attention module 822 which sends output to a SoftMax layer 834.

Figure 9:
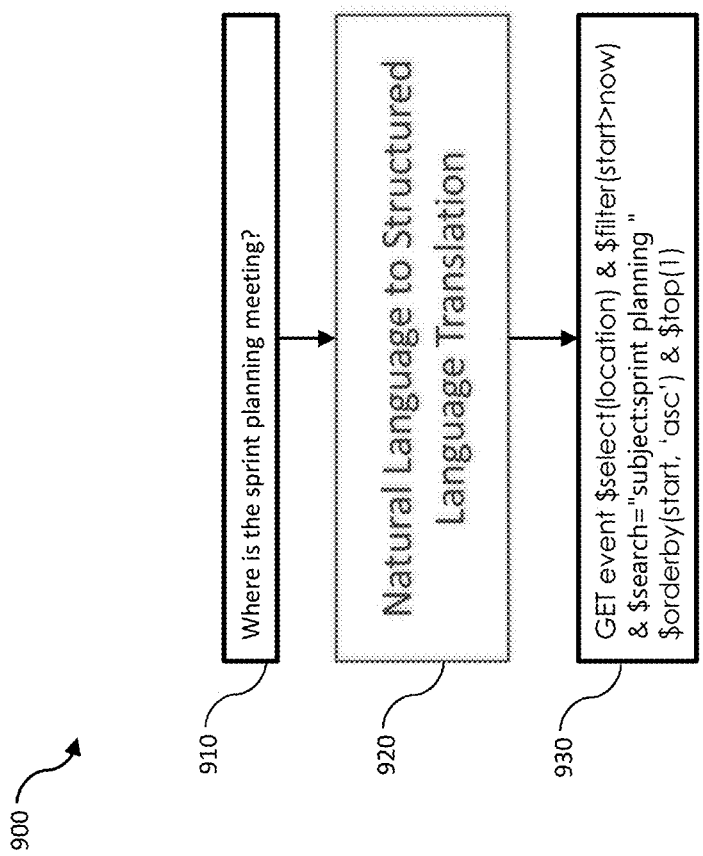
FIG. 9 illustrates one embodiment of an example of a natural language text source instance transformed into annotated machine-readable text.
Figure 10:
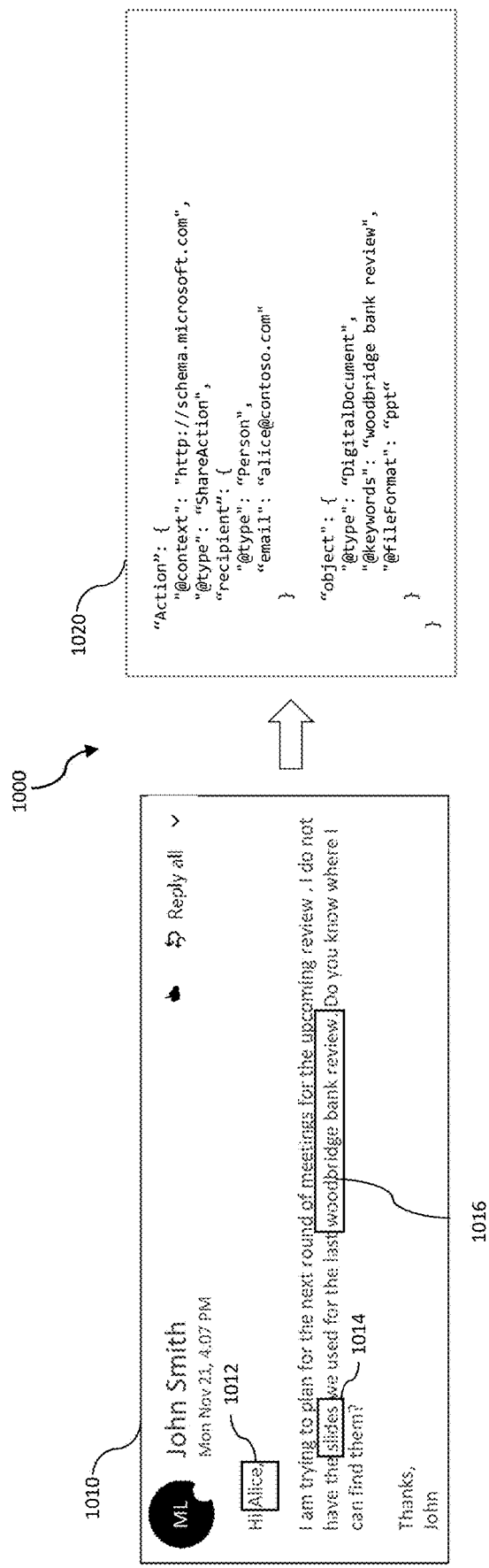
FIG. 10 illustrates one embodiment of an example user interface displaying a natural language source instance that is transformed into annotated machine-readable text via a particular populated target template.
Figure 11:
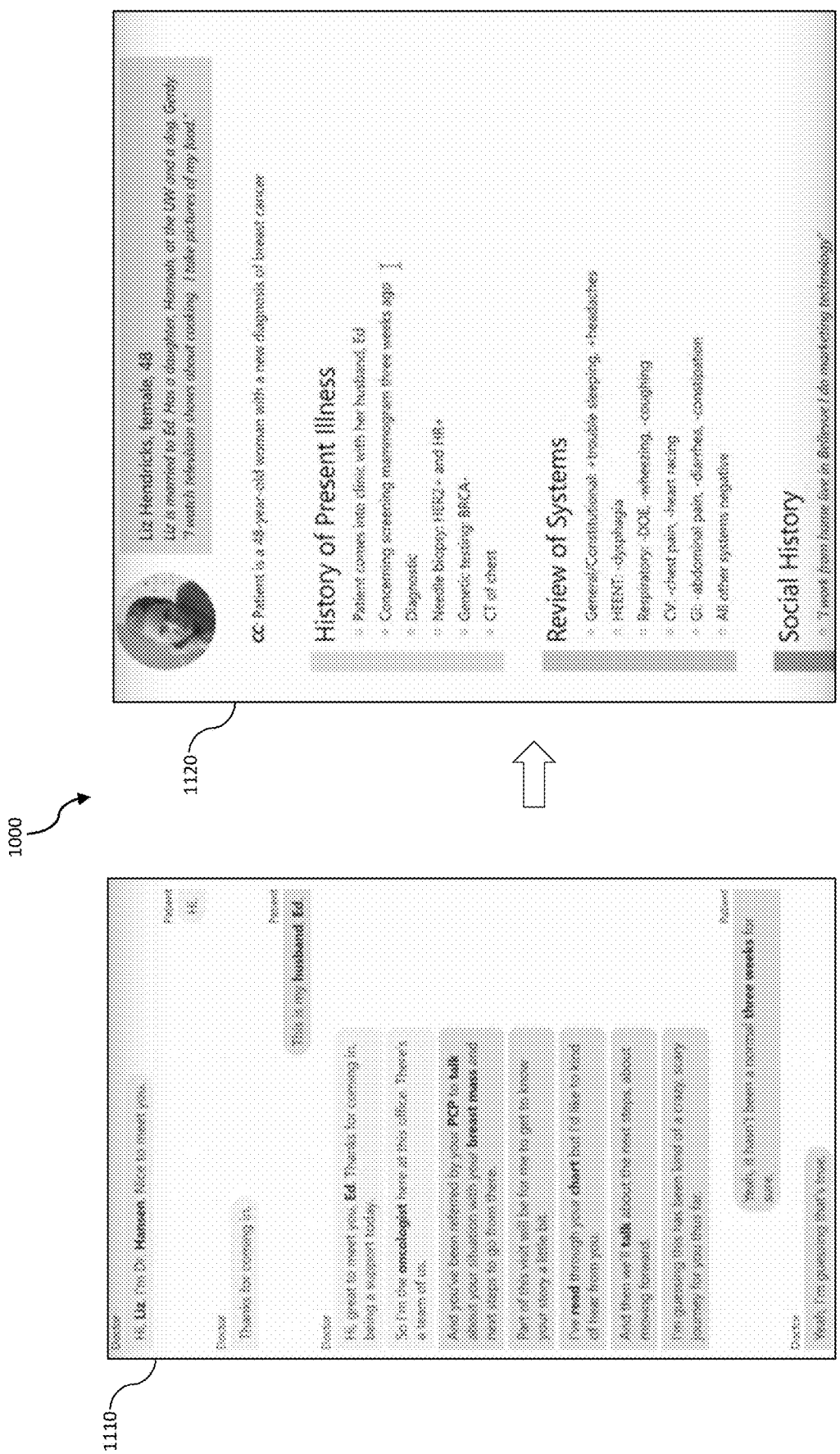
FIG. 11 illustrates one embodiment of an example user interface displaying a natural language source instance that has been processed into a populated target template.

Attention will now be directed to FIGS. 9-11, which illustrate a plurality of examples of transforming natural language into annotated machine-readable text, a populated target template, and/or other version of structured language comprising content extracted from the original natural language. FIG. 9 illustrates one embodiment of an example of a natural language text source instance transformed into annotated machine-readable text. For example, a source instance 910 is shown comprising the question "Where is the sprint planning meeting?". The source instance 910 is transformed into a populated target schema 930, the transformation being performed by a coupled machine learning model as described herein. In some embodiments, as shown in FIG. 9, the source instance comprises unannotated natural language, in this case, in the form of a conversation question. In some embodiments, the desired target schema is a search engine programming language-based target schema (e.g., SQL or other query language).

The translation of the natural language to structured language (e.g., item 920), is able to be performed or brought about by any one of the models and/or ML engines disclosed herein. For example, a model trained for natural language understanding tasks in a query language syntax is able to understand the question "Where is the spring planning meeting?". A target template is populated with values extracted from the source instance 910. The word "meeting" is determined to be a type of event. Thus a "GET event" template is chosen to be populated. For example, the word "where" is indicative of a value for location, wherein the key (identified by $) for "select" is populated with "location". The model identifies the what of the query as needing to populate the key for "search" by further specifying a subject (i.e., "sprint planning"). Additional query logic is defined (e.g., $filter(start>now)) so that when the machine readable text (i.e., populated target schema 930) is executed by, for example, a digital assistant, the digital assistant will be able to accurately return the location of the sprint planning meeting to the user.

In some embodiments, a user may speak out "Where is the sprint planning meeting?" to their voice-activated digital assistant (e.g., Cortana). Wherein the software for the digital assistant is able to access a coupled machine learning model as described herein, the coupled machine learning model is able to understand and transform the natural language query into a structured query. The structured query can be executed against databases associated with the user's calendar, emails, and/or texts to find and present the result of the query (e.g., the location of the sprint planning meeting).

Attention will now be directed to FIG. 10. FIG. 10 illustrates one embodiment of an example user interface displaying a natural language source instance that is transformed into annotated machine-readable text via a particular populated target template. For example, a source instance 1010 is shown comprising text from an email. The source instance 1010 is transformed into a populated target schema 1020, the transformation being performed by a coupled machine learning model as described herein. In some embodiments, as shown in FIG. 10, the source instance comprises unannotated natural language, in this case, in the form of an email sent by a user named John Smith. In some embodiments, the desired target schema is a search engine programming language-based target schema (e.g., SQL or other query language).

The translation of the natural language to structured language (e.g., populated target template 1020), is able to be performed or brought about by any one of the models and/or ML engines disclosed herein. For example, a model trained for natural language understanding tasks in a query language syntax is able to understand the text included in the email and identify words or values that corresponds to keys found in the target template 1020. The target template is populated with values extracted from the source instance 1010. The phrase "Do you know where I can find them?" is determined to be associated with an action (e.g., "Action" included in target template 1020). Thus an "Action" template is chosen to be populated. For example, the word "slides" 1014 is indicative of a value for the "object", wherein the key (identified by @) for "@type" is populated with "DigitalDocument" and the key for "@fileformat" is populated with "ppt". The model identifies the what of the query as needing to populate the key for "@keywords" by further populating that key with the value "woodbridge bank review" 1016. (e.g., for the "recipient") by recognizing that the value for Alice 1012 indicates that the @type key should be filled with "person" as Alice 1012 is inferred to be a person. The key for @email is also able to be filled with Alice's email (e.g., "alice@contoso.com").

Additional information is defined (e.g., "@context:" with "http://schema.microsoft.com" and/or "@type" filled with "ShareAction"). This is beneficial, for example, if the code included in the populated target template 1020 is executed by a suggestions engine such that when Alice receives the email, the suggestions engine is able to suggest file locations located within the defined context where she might find the "slides we used for the last woodbridge bank review". In some embodiments, the suggestions engine is able to suggest to the author of the email, John Smith, those same file locations after he types or sends the email, in the event that Alice is not available to find the files.

Attention will now be directed to FIG. 11. FIG. 11 illustrates one embodiment of an example user interface displaying a natural language source instance that has been processed into a populated target template. In some embodiments, the source instance comprises a recorded conversation (e.g., source instance 1110). As shown in FIG. 11, source instance 1110 comprises natural language from a conversation between a patient and her doctor. Keywords are identified in the source instance in bold text. For example, the patient says, "This is my husband, Ed", wherein the model (e.g., a coupled machine learning model trained via embodiments disclosed herein) facilitating the transformation of the natural language into a populated target template tags "husband" and "Ed" and infers that 1) another person joined the patient with the doctor and 2) that the other person was her husband, named Ed. The model is also able to identify and tag words like "three weeks" and associate that with a mammogram screening that occurred within that timeframe.

In some embodiments, as shown in FIG. 11, the natural language is transformed into machine-readable text (e.g., REST API) that pulls data into a user display format (e.g., target template 1120). Target template 1120 is shown having different sections such as an introduction, a history of present illnesses, a review of symptoms and social history. These headings are one example of different types of keys defined in the target template 1120, wherein values like the tagged words are extracted from the natural language and used to populate the target template via the underlying REST API code.

Thus, it should be appreciated that different actions are taken after the machine-readable text is generated from the unannotated language. For example, in some embodiments, the machine-readable text (i.e., machine-readable code) is executed by a processor (e.g., 112) to perform a query against a database and return results based on the query and information included in the machine-readable text. In some embodiments, the machine-readable text is executed by a processor to display the information in an organized user-friendly display (e.g., 1120). In some embodiments, the machine-readable text is executed to perform a task by a digital assistant, for example, taking notes, scheduling events, recording and scheduling reminders, and/or making purchases.

In view of the foregoing, it will be appreciated that the disclosed embodiments provide many technical benefits over conventional systems and methods for generating machine learning training data configured to train a machine learning model for natural language understanding application by automatically populating a plurality of target templates with a set of vocabulary words, thereby eliminating the need for a human annotator to manually populate the target templates with the appropriate information. Furthermore, it provides a system for generating thousands of target templates (e.g., parallel annotations) in an efficient and fast manner. This is in contrast to conventional systems using human annotators where it was difficult to produce large amounts of training data.

In some instances, the disclosed embodiments provide technical benefits over conventional systems and methods for training a machine learning model to perform natural language understanding by separately training a source model and a target model on different sets of training data. For example, by training a source model on unannotated natural language and then coupling that model with the target model, data included in the different sets of training data is not rendered to a human user during the training of the source model, the training of the target model, or during the coupling of the source model and the target model. This beneficially facilitates an improvement in data security of the data used in the training. Furthermore, it increases the availability and access to sources of natural language data that previously were not accessible because of privacy concerns of rending the data to a human user. Technical benefits also include providing a method to train a machine learning model to quickly and accurately transform unannotated natural language into machine-readable text.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., storage 140 of FIG. 1) that store computer-executable instructions (e.g., component 146 of FIG. 1) are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for training a machine learning model with generated annotations of source instances and while facilitating security of the source instances, the method being implemented by a computing system that includes at least one hardware processor and the method comprising:

the computing system receiving a first set of training data comprising a plurality of source instances comprising unannotated natural language;

the computing system training a first machine learning model with the first set of training data, the first machine learning model being configured to understand a semantic structure of the first set of training data;

the computing system receiving electronic content comprising (i) a set of target templates comprising a plurality of keys and (ii) a set of vocabulary words comprising a plurality of values, the plurality of values corresponding to the plurality of keys;

the computing system automatically populating the set of target templates with the set of vocabulary words to generate a second set of training data comprising synthetically populated target templates of key-value pairings, the second set of training data being formatted as annotated machine-readable text;

the computing system training a second machine learning model with the second set of training data, the second machine learning model being configured to understand an association between the plurality of keys and the plurality of values of the key-value pairings included in the populated target templates; and the computing system combining the first machine learning model and the second machine learning model into a coupled machine learning model by aligning word embeddings output from the first machine learning model and word embeddings output from the second machine learning model, the coupled machine learning model being configured to transform unannotated natural language into annotated machine-readable text.

2. The method of claim 1, wherein the coupled machine learning model is further configured to transform machine-readable code into natural language.

3. The method of claim 1, further comprising: the computing system using the coupled machine learning model to transform unannotated natural language into annotated machine-readable text.

4. The method of claim 1, wherein the unannotated natural language comprises an unstructured query and the annotated machine-readable text comprises a query structured according to a particular target schema or particular target programming language.

5. The method of claim 1, further comprising: the computing system performing a natural language understanding task by executing the annotated machine-readable text.

6. The method of claim 1, wherein the first set of training data is used to train the first machine learning model with unsupervised training and without rendering the plurality of source instances to any human user for annotating the first set of training data during the training of the first machine learning model.

7. The method of claim 1, wherein the first and second machine learning models are combined by aligning a plurality of word embeddings from the unannotated natural language and the machine-readable code.

8. The method of claim 7, wherein the word embeddings are aligned by performing at least the following:

mapping tokens included in the unannotated natural language and the machine-readable text; and aligning an entire context of a sequence of tokens included in the unannotated natural language and the annotated machine-readable text.

9. The method of claim 1, wherein the first machine learning model and second machine learning model are combined by formulating at least a shared encoder.

10. The method of claim 1, wherein the method further includes training the coupled machine learning model to learn a source decoder configured to decode unannotated natural language and a target decoder configured to decode machine-readable code.

11. The method of claim 10, further comprising the computing system refining the source decoder and the target decoder by employing a feedback loop between the source decoder and the target decoder to facilitate an improvement in accuracy of a natural language understanding transformation performed between the source decoder and the target decoder.

12. The method of claim 1, wherein the second set of training data comprises syntax corresponding to a particular programming language.

13. The method of claim 12, wherein the particular programming language comprises one of the following: REST API, custom XML, SQL or JSON.

14. The method of claim 1, wherein the plurality of values included in the set of vocabulary words are received from one or more vocabulary databases.

15. The method of claim 14, wherein a particular target template included in the set of target templates comprises a mapping to a particular vocabulary database of the one or more vocabulary databases.

16. A computing system comprising:
one or more processors;
one or more computer-readable hardware storage devices having stored thereon computer-executable instructions that are executable by the one or more processors to cause the computer system to at least:
receive a first set of training data comprising a plurality of source instances comprising unannotated natural language;
train a first machine learning model with the first set of training data, the first machine learning model being configured to understand a semantic structure of the first set of training data;
receive electronic content comprising (i) a set of target templates comprising a plurality of keys and (ii) a set of vocabulary words comprising a plurality of values, the plurality of values corresponding to the plurality of keys;
automatically populate the set of target templates with the set of vocabulary words to generate a second set of training data comprising synthetically populated target templates of key-value pairings, the second set of training data being formatted as annotated machine-readable text;
train a second machine learning model with the second set of training data, the second machine learning model being configured to understand an association between the plurality of keys and the plurality of values of the key-value pairings included in the synthetically populated target templates;
combine the first machine learning model and the second machine learning model into a coupled machine learning model, the coupled machine learning model being configured to transform unannotated natural language into annotated machine-readable text; and
operating the coupled machine learning model to generate annotated machine-readable text directly from unannotated natural language.

17. The computing system of claim 16, wherein the computer-executable instructions are executable by the one or more processors to further cause the computer system to perform a natural language understanding task by executing the annotated machine-readable text.

18. The computing system of claim 16 further comprising one or more of the following: a data retrieval engine, a template population engine, a training engine, a stacking engine, an encoding engine, a decoding engine, a refinement engine or an implementation engine.

19. A computer implemented method for training a machine learning model with generated annotations of source instances and while facilitating security of the source instances, the method being implemented by a computing system that includes at least one hardware processor and the method comprising:
the computing system receiving a first set of training data comprising a plurality of source instances corresponding to a first language;
the computing system training a first machine learning model with the first set of training data, the first machine learning model being configured to understand a semantic structure of the first set of training data in the first language;
the computing system receiving a second set of training data comprising a plurality of source instances corresponding to a second language;
the computing system training a second machine learning model with the second set of training data, the second machine learning model being configured to understand a semantic structure of the second set of training data in the second language;
the computing system combining the first machine learning model and the second machine learning model into a coupled machine learning model by aligning word embeddings output from the first machine learning model and word embeddings output from the second machine learning model, the coupled machine learning model being configured to transform source instances in the first language into source instances in the second language.

20. A computer system comprising:
one or more processors;
one or more computer-readable hardware storage devices having stored thereon computer-executable instructions that are executable by the one or more processors to cause the computer system to at least:
operate a coupled machine learning model configured to transform unannotated natural language into machine-readable text; and
transform unannotated natural language into machine readable text; wherein the coupled machine learning model comprises:
a first machine learning model trained on a first set of training data comprising unannotated natural language, the first machine learning model configured to understand a semantic structure of the first set of data; and
a second machine learning model trained on a second set of training data comprising a plurality of target templates populated with a plurality of values, the plurality of target templates comprising a plurality of keys corresponding to the plurality of values;
wherein the second machine learning model is configured to understand an association between the plurality of keys and the plurality of values of one or more key-value pairings included in the populated target templates; and
wherein the first machine learning model and second machine learning model are combined to form the coupled machine learning model which further comprises a source decoder trained to decode unannotated natural language and a target decoder trained to decode target templates, and an encoder shared between the source decoder and the target decode.

* * * * *